June 28, 1960 W. L. HEWATT 2,942,296
VULCANIZING MACHINE
Filed May 14, 1958 2 Sheets-Sheet 1
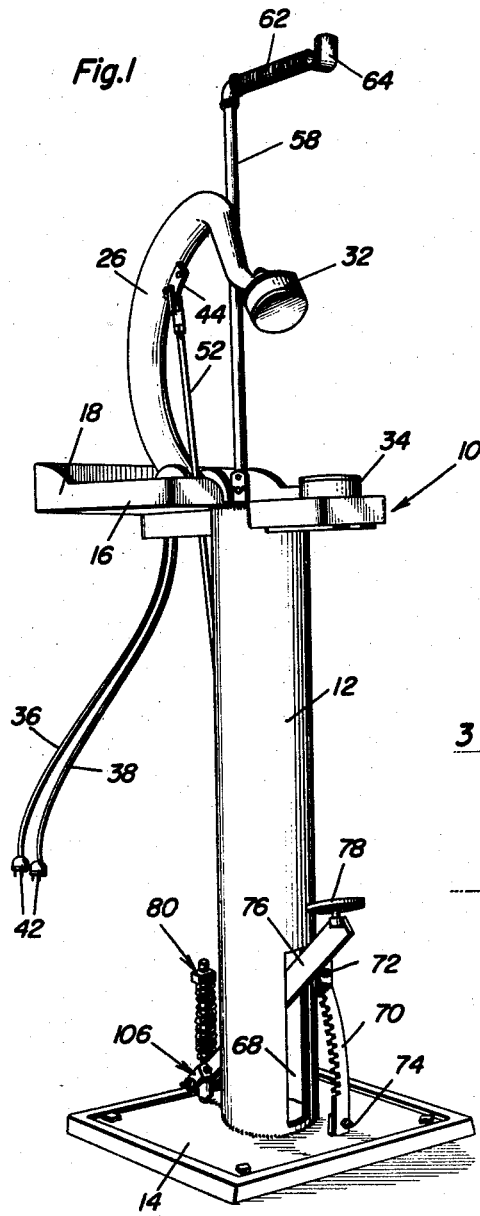
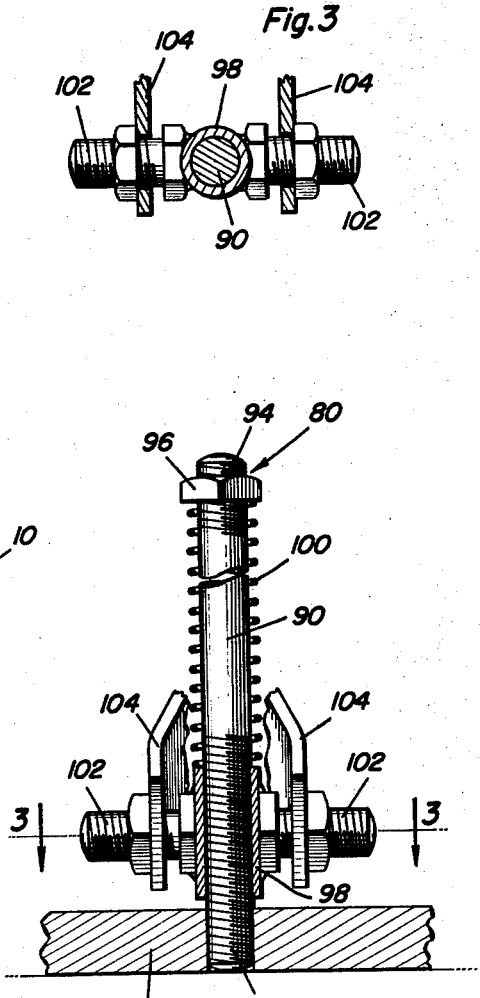
Willis L. Hewatt
INVENTOR.

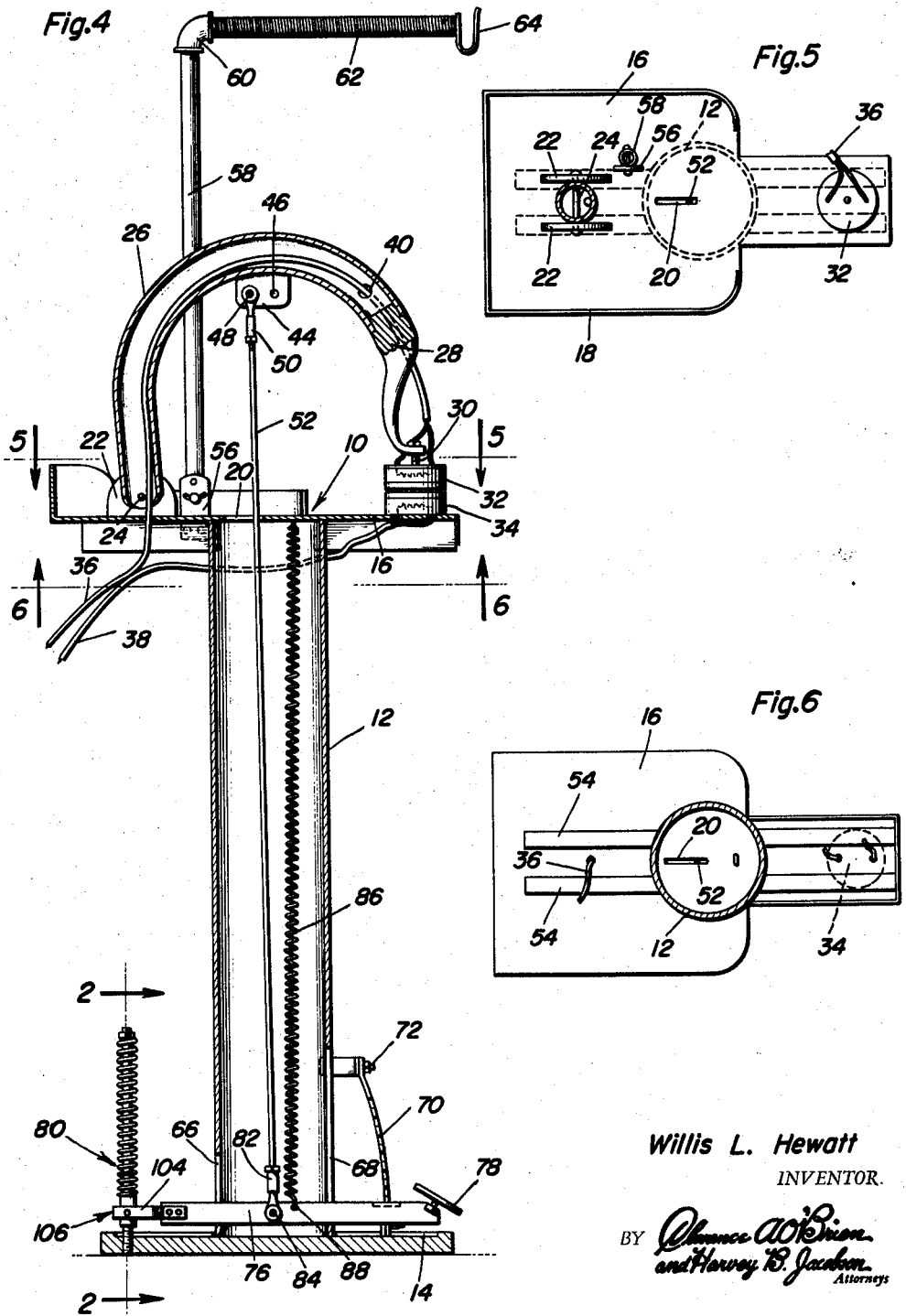

United States Patent Office 2,942,296
Patented June 28, 1960

2,942,296

VULCANIZING MACHINE

Willis L. Hewatt, P.O. Box 905, Hugoton, Kans.

Filed May 14, 1958, Ser. No. 735,303

2 Claims. (Cl. 18—18)

This invention comprises a novel and useful vulcanizing machine and more particularly relates to a spot vulcanizer for repairing breaks in the casings of tires and particularly of tubeless tires.

The primary object of this invention is to provide a simple, inexpensive but easily operated spot vulcanizer for tire casings.

A further object of the invention is to provide a spot vulcanizer wherein the vulcanizing jaws shall be positioned conveniently to facilitate operations upon a tire casing so as to permit ready inspection of the casing before, during or after the vulcanizing operation.

A further object of the invention is to provide a spot vulcanizer device in accordance with the preceding objects which shall incorporate therein improved means for supporting a tire casing for the vulcanizing operation, which tire supporting means shall include a resilient arm for supporting tire casings in an improved manner.

Yet another object of the invention is to provide a spot vulcanizing device in accordance with the preceding objects which shall be pedal operated and wherein the readily controlled resilient pressure may be applied to the vulcanizing jaws for clamping a tire casing therebetween.

A further and more specific object of the invention is to provide a spot vulcanizer for tire casings in accordance with the foregoing objects wherein the pedal operating means for the vulcanizing jaws may be compactly mounted and extended through the support column at the lower end thereof, and wherein connecting means a return spring means shall be housed within the support column and operatively connected with moving elements of the device.

And a final important object of the invention to be specifically enumerated herein resides in the provision of a tire vulcanizing device in accordance with the above mentioned objects wherein a pedal operated lever shall control the movement of the vulcanizing jaws towards each other; resilient means shall move the vulcanizing jaws away from each other; and a flexible yieldable fulcrum support shall be provided for the foot operated lever to render more resilient the operation of the latter.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a suitable embodiment of apparatus in accordance with this invention, the vulcanizing jaws of the device being shown in their open position;

Figure 2 is an enlarged detail view, parts being broken away, and taken in vertical section substantially upon the plane indicated by the section line 2—2 of Figure 4 and showing structural details of the resilient fulcrum for the foot actuated operating lever for the vulcanizing jaws;

Figure 3 is a horizontal sectional detail view taken substantially upon the plane indicated by the section line 3—3 of Figure 2;

Figure 4 is a view in vertical section through the support and the curved arm carrying the movable jaw of the apparatus; and Figures 5 and 6 are horizontal sectional views taken substantially upon the planes indicated by the section lines 5—5 and 6—6 respectively of Figure 4.

In the accompanying drawings there is shown a suitable embodiment of apparatus in accordance with the principles of this invention adapted to efficiently perform spot vulcanizing operations upon portions of a tire casing and especially tire casings of the tubeless type. The vulcanizing device illustrates a support designated generally by the numeral 10 and which includes a hollow or tubular column 12 which may be opened at both its upper and lower ends, the column being rigidly secured in any suitable manner at its lower end to the top surface of a support base 14, and carrying and supporting upon its upper end the horizontally extending platform 16. This upper platform may conveniently comprise a flat plate having upstanding side walls 18 thereon to provide a tray or the like, and over the upper end of the tubular column 12, this plate or base of the platform 16 is provided with an opening 20 therethrough for a purpose to be subsequently set forth.

As will be apparent from Figures 4 and 5, a pair of parallel support brackets 22 rise from the platform 16 to one side of the opening 20 and receive therebetween a horizontal pivot pin 24. These brackets and pivot pin comprise a fulcrum and a curved tubular arm 26 which is open at its lower end is pivoted upon the pivot pin 24 for vertical movement about the horizontal axis of this pin.

The other end of this arm has a solid plug 28 therein and extending therefrom, to which is secured as by fastening bolt 30 a movable jaw 32. Fixedly secured to the platform 16 is a fixed jaw 34 and a movable jaw is operable towards and from the fixed jaw as will be apparent from a comparison of Figures 1 and 4, for clamping a portion of a tire casing therebetween.

The two jaws 32 and 34 are provided with heating means and conveniently this may take the form of electrical heating elements housed within these jaws. Electric cables 36 and 38 are respectively connected to the heating elements of the movable and fixed jaws 32 and 34. The cable 36 extends through the open pivoted end of the curved tubular arm 26, and adjacent the other end thereof it merges through an opening 40 and is suitably connected to the heating element within the movable jaw 32. The cable 38 extends below the platform 16 and in turn is connected to the heating element within the fixed jaw 34. It will be understood that these cables are provided with suitable connector plugs 42, see Figure 1, whereby the cables may be connected to any suitable source of electric current for supplying energy to the jaws.

Intermediate the ends of the curved arm 26 is a depending flange, web or lug 44 having suitable apertures 46 therethrough which may selectively receive a pivot pin 48 by which a clevis or yoke 50 on the upper end of a connecting rod 52 may be pivotally connected to the tubular arm for imparting vertical swinging movement to the same.

The connecting rod 52 extends through the opening 20 into the interior of the hollow tubular column 12 and is operated by means to be subsequently set forth. Although as illustrated the connecting rod 52 is a rigid member, it will be understood that it is in effect a tension element and may comprise a cable or the like if desired.

In order to impart stiffness to the platform 16, a pair of parallel reinforcing bars 54 are secured to the underside of the same, these bars also being rigidly connected to opposite sides of the upper end of the column 12. Extending through the platform and secured to one of these bars is a mounting bracket 56 and a standard 58 is rigidly secured to this bracket. At its upper end the standard has an elbow 60 and a stiff spirally wound spring 62 projects horizontally therefrom to provide a resilient arm at the outer end of which there is provided a U-shaped terminal member 64 providing a supporting hook. The member 64 is adapted to receive therein the bead and side wall portion of a tire casing for suspending the latter above the platform and to facilitate the clamping of a selected portion of a tire casing between the fixed and movable jaws to perform the vulcanizing operation thereon.

Referring now more specifically to Figures 1 and 2 it will be seen that the lower end of the tubular column 12 is provided with a pair of transversely aligned vertically extending slots 66 and 68 which are disposed diametrically with respect to each other. An arcuately shaped vertically extending toothed sector or latch 70 is secured to the column 12 at the upper end of this sector as by a fastening means 72, and at its lower end is secured as by fastener 74 to the base 14. This sector is adjacent the slot 68 and is adapted to receive and lock in selected position the end portion of a foot actuated operating lever 76 which is disposed through and is vertically movable in the aligned slots 66 and 68. At its outer end this lever is provided with a pedal 78 to facilitate operation of the latter by a foot of the user. At its other end, on the other side of the column, the lever 76 is secured to a resilient fulcrum designated generally by the numeral 80, so that the lever can tilt or pivot about its hinged connection to this fulcrum.

The previously mentioned tension element 52 is provided at its lower end with a yoke or clevis 82 which is connected as by a pivot pin 84 to the lever 76 intermediate the ends of the latter, and a resilient return means 86 in the form of a tension spring is housed also within the column 12, being connected at its upper end to the platform 16, and at its lower end being connected to the lever 76 intermediate the ends of the latter, as by engagement in an aperture 88 in the lever.

As so far described, it will be apparent that the spring means 86 tends to raise the lever, and thus actuate the connecting rod 52 in a direction to elevate the movable jaw 32 and move the same away from the fixed jaw 34, as will be apparent from a comparison of Figures 4 and 1. However, when the lever 76 is depressed by actuation of the pedal 78, the connecting rod 52 and the movable jaw will be lowered against the resistance of the return spring 86 to compressively clamp a portion of a tire casing between the fixed and movable jaws in order that the vulcanizing operation may be performed thereon.

Referring now especially to Figures 2 and 3 it will be seen that the resilient fulcrum includes a vertically extending rod or stud 90 screw threaded at its opposite extremities as at 92 and 96 for engagement with the base 14 and to receive an adjusting nut 96. Slidable upon this rod is a sleeve 98 which is urged into a lowered position by a compression spring 100 which encircles the rod 90. Projecting laterally from diametrically opposite sides of the sleeve 98 are a pair of bolts 102 upon which are received the two arms 104 which constitute the ends of a yoke 106 secured to the end of the lever 76.

It will thus be observed that normally the return spring 86 will hold the movable jaw into its raised position at which time the operating lever 76 will also be raised as shown in Figure 1, with the sleeve 98 being positioned adjacent the lower end of the rod 90 in the manner suggested in Figure 2. When a tire casing is disposed between the two jaws, resting upon the fixed jaw, and if desired being supported by the hook 64 on the flexible arm 62, the pedal 78 is depressed causing the tension element 52 to force the movable jaw 32 downwardly against the resistance of the turn spring 86 and thereby compressively clamp the selected portion of the tire casing between the two fulcanizing jaws.

It will be seen that further downward pressure after the tire is clamped between the two jaws will serve merely to impart movement to the resilient fulcrum, causing the sleeve 98 to be lifted against the resistance of the spring 100, the latter being adjustable by the nut 96. Thus, an increasing resilient pressure can be applied to the jaws to clamp the tire therebetween, without danger of damaging the mechanism due to the resilient connections above described. The ratchet means 70 will serve to latch the lever into pressed position to thereby maintain the desired compressive engagement of the jaws upon the tire casing for the desired length of time that it is desired to apply heat to the tire casing for vulcanizing the same.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A spot vulcanizer for tire casings comprising a support, a platform supported upon the upper end of said support, fixed and movable jaws mounted upon said platform for clamping therebetween a portion of a tire casing to be vulcanized, means for heating said jaws, foot actuated operating means connected to said movable jaw for moving the latter towards and from said fixed jaw, resilient return means connected to said support and to said operating means for moving said jaws apart, a standard mounted upon said platform and having a resilient arm overhanging said jaws for supporting thereon a tire casing for vulcanizing, said support including a tubular support having a slot extending transversely through the lower portion thereof, said operating means including a lever, a resilient fulcrum pivoted to said lever at one end, a tension rod connected to said arm and lever, said tension rod and said resilient return means being connected to said lever intermediate the ends of the latter, an upstanding rod carried by the lower end of said support, said resilient fulcrum including a sleeve slidable upon said rod, a spring engaging said rod and sleeve and urging the latter downwardly, said lever having a yoke embracing and pivoted to said sleeve.

2. In a spot vulcanizer for tire casings, the combination of a vertical support, a platform provided at the upper end of said support, a base provided at the lower end of the support, a fixed jaw provided on said platform, a curved arm pivoted to the platform, a movable jaw carried by said arm for movement toward and away from said fixed jaw, an upstanding rod provided on said base, a sleeve slidable on said rod, a lever pivoted at one end thereof to said sleeve for movement in a vertical plane, a foot pedal provided at the other end of said lever, a link connected to said lever and to said arm for moving said movable jaw toward said fixed jaw when said pedal is depressed, a compression spring provided on the upper portion of said rod and engaging said sleeve for urging the latter to a downwardly slid position on said rod, said sleeve being slidable upwardly on said rod against the action of said compression spring when said pedal is depressed further after said movable jaw is in clamping engagement with a tire casing against the fixed jaw, and resilient means connected to said lever for moving the movable jaw away from the fixed jaw upon releasing of said pedal.

References Cited in the file of this patent

UNITED STATES PATENTS

| | | |
|---|---|---|
| 826,213 | Ahrbin | July 17, 1906 |
| 1,711,978 | Wanders | May 7, 1929 |
| 1,754,575 | Scharpf | Apr. 15, 1930 |
| 1,997,268 | Scharpf | Apr. 9, 1935 |
| 2,422,482 | Auyer | June 17, 1947 |
| 2,514,197 | Groten et al. | July 4, 1950 |